United States Patent [19]
Young

[11] Patent Number: 5,952,588
[45] Date of Patent: Sep. 14, 1999

[54] CAPACITIVE SENSING ARRAY DEVICE

[75] Inventor: Nigel D. Young, Redhill, United Kingdom

[73] Assignee: U. S. Philips Corporation, New York, N.Y.

[21] Appl. No.: 08/896,757

[22] Filed: Jul. 18, 1997

[30] Foreign Application Priority Data

Jul. 20, 1996 [GB] United Kingdom .................... 9615278

[51] Int. Cl.$^6$ ..................................................... G01L 5/00
[52] U.S. Cl. ........................................ 73/862.626; 73/777
[58] Field of Search ....................... 73/862.473, 826.626, 73/862.627, 862.628, 777; 11/765

[56] References Cited

U.S. PATENT DOCUMENTS

| | | | |
|---|---|---|---|
| 4,644,801 | 2/1987 | Kustanovich | 73/862.626 |
| 4,682,236 | 7/1987 | Wang et al. | 358/213.26 |
| 4,864,462 | 9/1989 | Madou et al. | 324/663 |
| 5,000,817 | 3/1991 | Aine | 156/633 |
| 5,348,892 | 9/1994 | Miyake et al. | 437/3 |
| 5,515,738 | 5/1996 | Tamori | 73/862.626 |

FOREIGN PATENT DOCUMENTS

| | | | |
|---|---|---|---|
| 002800844 | 7/1978 | Germany | 73/862.626 |
| 403158731 | 7/1991 | Japan | 73/862.626 |

*Primary Examiner*—Max Noori
*Attorney, Agent, or Firm*—Steven R. Biren

[57] ABSTRACT

A capacitive sensing array device, such as a fingerprint sensing device, includes an array of individual sensing electrodes (14) covered by a layer of insulating material (40) defining a sensing surface on which a person's finger is placed, each sensing electrode, its overlying fingerprint portion and intervening insulating layer providing a capacitance in operation. The sensing electrodes are of chromium and the covering insulating material includes a thin layer of chromium oxide which offers excellent scratch resistance and can be formed conveniently by oxidation of a surface region of the sensing electrodes. In a row and column array, address lines (18) extending between rows of electrodes (14) may also include chromium and be covered by chromium oxide. Preferably, the sensing electrodes and address lines are defined from a common deposited chromium layer.

6 Claims, 2 Drawing Sheets

CAPACITIVE SENSING ARRAY DEVICE

BACKGROUND OF THE INVENTION

The present invention relates to a capacitive sensing array device comprising an array of sensing electrodes which are covered by a layer of electrically insulating material defining a sensing surface spaced from the sensing electrodes. The invention is concerned particularly, but not exclusively, with a fingerprint sensing device in which the array of sensing electrodes are used to sense capacitively the pattern of ridges and valleys of a person's fingerprint when placed over the sensing surface.

Examples of capacitive sensing array devices of the above kind, particularly fingerprint sensing devices, are described in U.S. Pat. No. 5,325,442 and British Patent Application No. 9608747.3. In these example devices a row and column matrix array of sense elements is provided on an insulating substrate using thin film technology. Each sense element comprises a metal sensing electrode and at least one switching device, in the form of a TFT (thin film transistor), connected thereto. The switching devices of the sense elements are connected to a peripheral drive circuit via sets of row and column address conductors. The array of sensing electrodes is covered by a layer of deposited insulating material comprising silicon nitride or polyimide material whose surface remote from the sensing electrodes defines a substantially planar sensing surface over which a person's finger is placed, the sensing electrodes together with their overlying dielectric material and individual fingerprint portions, i.e. ridges and valleys, constituting capacitors. The capacitances of these individual capacitors are sensed by means of the drive circuit applying charges to the sense electrodes, via their associated address conductors and switching devices at the sense elements, on a row at a time basis and measuring the supplied charge. The capacitance of the individual capacitors is dependent on the spacing between a sensing electrode and an overlying fingerprint portion, as determined by the thickness of the dielectric layer and the presence of a fingerprint ridge or valley, and through measuring this charge for each sense element in the array by scanning each row of sense elements in turn an electronic image or representation of the three dimensional form of the fingerprint surface provided by the variation in sensed capacitances produced over the array by the fingerprint ridge pattern is obtained.

SUMMARY OF THE INVENTION

It is an object of the present invention to provide an improved capacitive sensing array device of the above kind.

According to the present invention, a capacitive sensing array device of the kind described in the opening paragraph is characterised in that the sensing electrodes comprise chromium and the electrically insulating covering layer comprises chromium oxide. Besides being highly compatible with thin film processing technology employed to fabricate such a device, and offering good adhesion properties, the use of chromium and chromium oxide for the sensing electrodes and insulating layer materials offers a number of significant advantages.

The surface of the insulating layer, forming the sensing surface, is exposed and thus subject to potentially damaging influences. Any damage in the nature of abrasions or scratches would seriously impair operation of the device in sensing, for example, fingerprints. Chromium oxide has excellent properties in this respect. It is a very hard, highly scratch resistant, material. Such material can be expected to withstand the effects of dirt and cleaning likely to be encountered in normal usage without suffering abrasion damage and the like. Beneficially, only a comparatively thin layer of this material need be used thus minimising the thickness of the dielectric in the capacitor formed by the sensing electrode and overlying fingerprint portion yet still providing the necessary protective and electrical breakdown resistive qualities required from this layer. Reducing the dielectric layer thickness, and the consequential effect on capacitance values, is important having regard to the very small capacitance values likely to be expected in, for example, a fingerprint sensing device. In a preferred embodiment, the chromium oxide insulating layer comprises a converted surface region of the chromium electrode. The insulating layer can readily, and conveniently, be formed by oxidation of the surface region of the deposited chromium layer constituting the sensing electrodes. A highly uniform chromium oxide ($Cr_2O_3$) layer of, preferably, around 5 to 10 nm (50–100 A) in thickness can be formed by oxidising the chromium layer using, for example, fuming nitric acid or by subjecting the chromium electrodes to an oxygen plasma. After patterning a chromium layer on a substrate to define the array of sensing electrodes, the structure is simply immersed in a bath of fuming nitric acid or exposed to the oxygen plasma to convert the surface region of all exposed areas of chromium to chromium oxide. Such a layer of chromium oxide, in the role of capacitor dielectric, would give a capacitance value of approximately $6 \times 10^{-9}$ F/cm$^2$ at a thickness of around 10 nm and would be capable of withstanding around ±5V without passing current. In contrast, an insulating layer of SiN material would normally have to be around 200 nm (2000 A) in thickness to avoid problems with pin holes and an insulating layer of polyimide material, which is very soft and susceptible to scratching, would usually be greater than 100 nm in thickness.

In a particularly preferred embodiment, the sensing electrodes are arranged in rows and conductive address lines, via which the capacitors are addressed by a peripheral circuit, extend between adjacent rows of sensing electrodes which address lines similarly comprise chromium and are covered by an insulating layer of chromium oxide that forms part of the sensing surface. Conveniently, the address lines and the sensing electrodes are formed from a common deposited layer of chromium. The device may be of the active matrix kind, as described in U.S. Pat. No. 5325442, in which case a switching device, e.g. a TFT, is located adjacent end sensing electrode and connected between the sensing element and an address line.

The sensing array device can, of course, be used for purposes other than fingerprint sensing. By scaling up the area of the sensing electrodes appropriately, the sensing device can provide a large area matrix sensor device responsive to touch inputs from, for example, a person's finger or a suitable pen. Such a device could be utilised as a graphics tablet or the like.

BRIEF DESCRIPTION OF THE DRAWINGS

An embodiment of a capacitive sensing array device, and particularly a fingerprint sensing device, in accordance with the present invention will now be described with reference to, and as shown in, the accompanying drawings, in which.

It should be understood that the Figures are not drawn to scale and that certain dimensions may have been exaggerated while others have been reduced. The same reference numerals are used throughout the Figures to indicate the same, or similar, parts.

DESCRIPTION OF THE PREFERRED EMBODIMENTS

Figure 1:
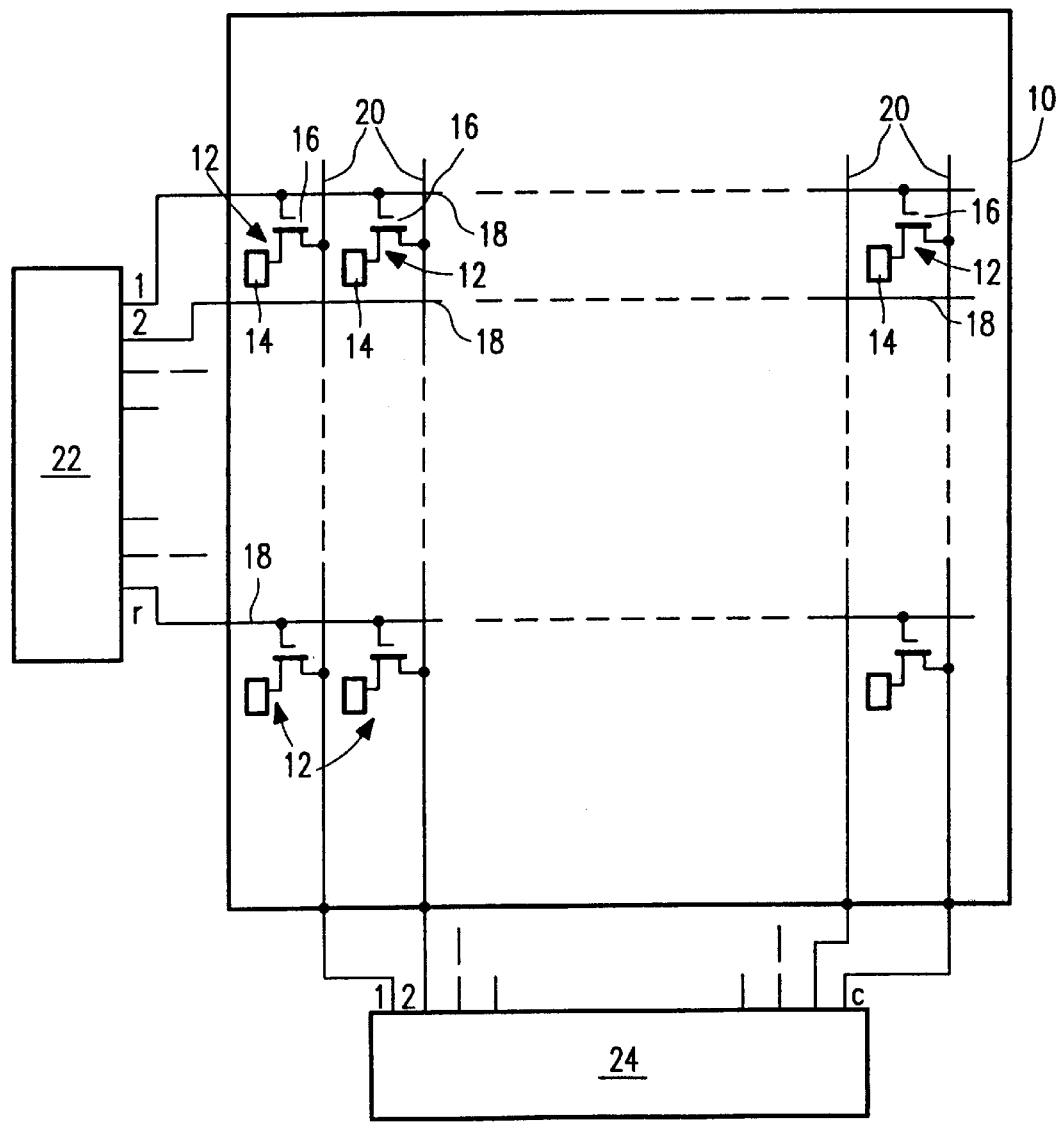
FIG. 1 is a simplified schematic diagram of the matrix capacitive sensing device showing an array of sense elements together with associated addressing circuitry.

Referring to FIG. 1, the fingerprint sensing array device comprises an active matrix addressed sensing pad 10 having an X-Y array of regularly-spaced sense elements 12 operable to scan a fingerprint. For simplicity only a few sense elements are shown but in practice there may be around 512 rows and columns of sense elements occupying an area of approximately 2.5 cms square.

Each sense element 12 comprises an electrically-conductive sensing electrode 14 connected to the drain of a TFT 16 whose gate and source terminals are connected respectively to associated row and column address conductors 18 and 20. The gates of the TFTs of all the sense elements in a row are connected to a respective one of the set of row address conductors and the sources of the TFTs of all the sense elements in a column are connected to a respective one of the set of column address conductors. The row address conductors are connected their one ends to a row drive circuit 22 and the column address conductors are connected at their one ends to a sense circuit 24.

The active matrix sense element array is of the kind described in U.S. Pat. No. 5,325,442 whose disclosure is incorporated herein and to which reference is invited for a detailed description of its manner of operation. Briefly, the row drive circuit 22 applies selection signals to each row conductor 18 in sequence so as to turn on the TFTs 16 of the sense elements 12 in the selected row. At the same time a predetermined voltage is applied to the column conductors 20. As will be described, the sensing electrodes 14 of the sense elements are covered directly by a layer of electrically insulating material whose exposed surface, remote from the sensing electrodes, defines a planar sensing surface upon which a person's finger whose print is to be scanned is placed. Actual, or close, physical contact with this surface occurs at the ridges of the fingerprint while valleys in the fingerprint profile are spaced from the surface by a considerably greater distance. The ridged finger surface is thus spaced from the array of sensing electrodes 14 by a minimum distance determined by the thickness of the insulating film. Each sense electrode and its respective overlying portion of the finger surface form opposing plates of a capacitor with the upper plate, constituted by the finger portion, being effectively at ground potential and with the intervening insulating film, and any air gap present between the film and the finger portion forming the capacitor dielectric. The capacitance of these individual capacitors varies as a function of the spacing between the proximate finger surface and the sensing surface with larger capacitances occurring where fingerprint ridges are in contact with the surface and smaller capacitances occurring where valleys are present.

When a row of sense elements is selected, the capacitances of the sense elements are charged and the amount of charge delivered to a capacitor through their associated column conductors is detected in the sense circuit 24 by means of charge or current sensing amplifiers. Each row of sense elements scanned and addressed in this way in turn to provide an electronic image representative of the capacitance variation over the array, and thus the three dimensional profile of the fingerprint.

Figure 2:
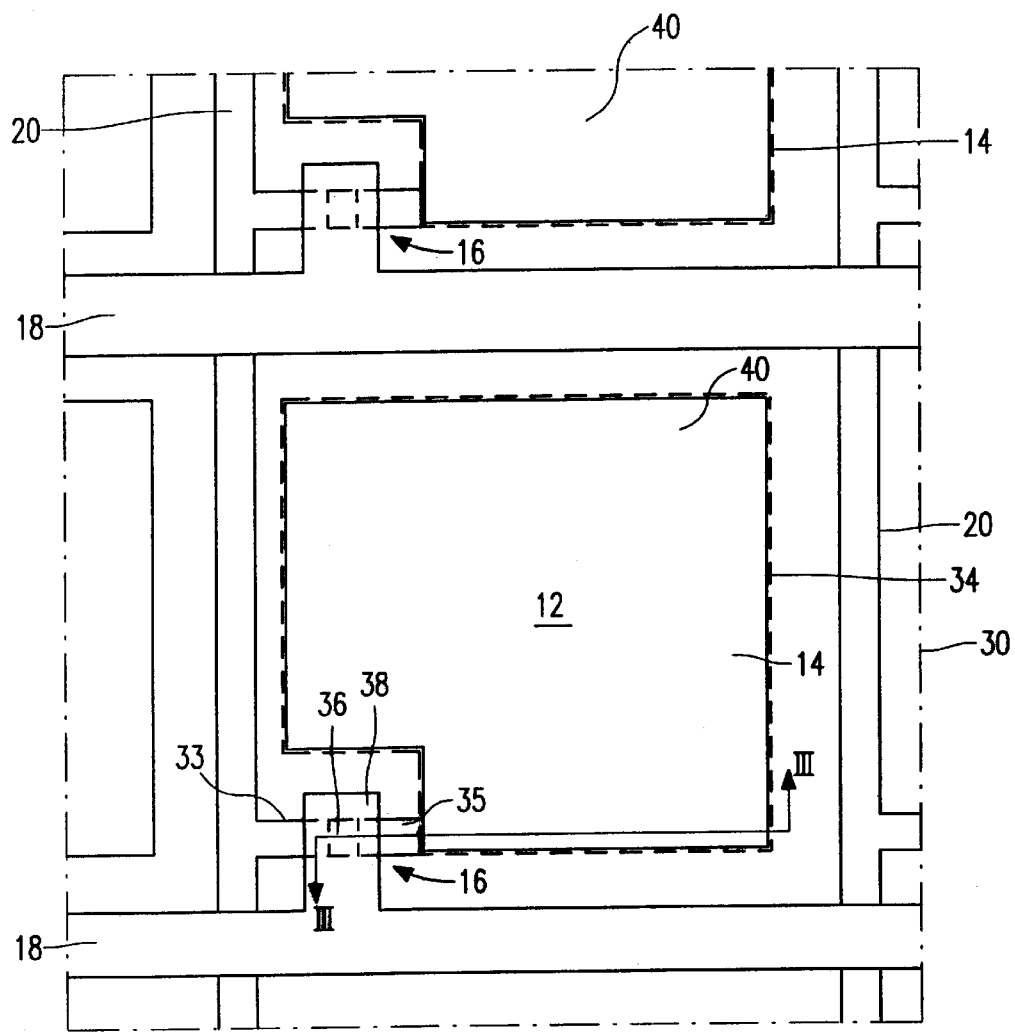
FIG. 2 is a schematic plan view of part of the sense element array showing the layout of a typical sense element.
Figure 3:
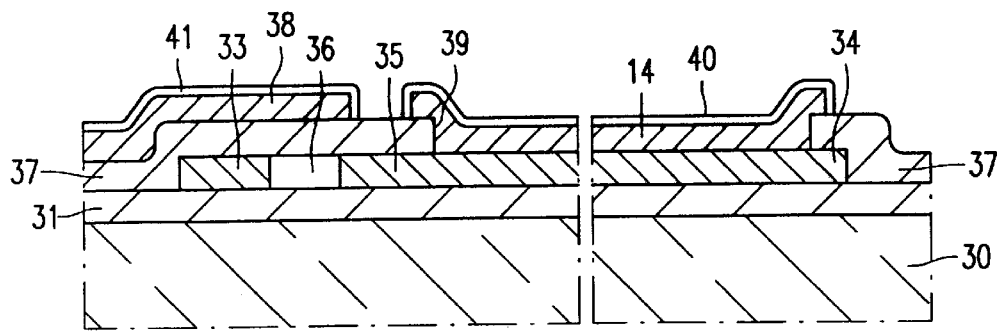
FIG. 3 is a schematic cross-sectional view along the line III—III of FIG. 2.

The lay-out and construction of a typical sense element 12 of the array is illustrated in FIG. 2 which shows the sense element in plan view, and in FIG. 3 which shows a cross-sectional view along the line III—III of FIG. 2. The sensing electrode 14, which is generally rectangular and occupies the area between immediately adjacent pairs of row and column conductors 18 and 20, is connected to the drain of the TFT 16 located adjacent the intersection of the associated row and column conductors. The electrodes 14, TFTs 16 and row and column conductors 18, 20 are all carried on an insulating substrate 30 of glass or plastics material and fabricated using standard PECVD thin film processing technology. The surface of the substrate 30 is covered by an insulating buffer layer 31 of silicon dioxide. A layer of polysilicon material is deposited over the layer 31 and is selectively doped by implantation and defined photolithographically to form the column conductors 20, with integral extensions 33 constituting the TFT source terminals, and the regions 34, parts 35 of which constitute the drain terminals of the TFTs, from n+polysilicon material, and TFT channel regions 36 bridging the source and drain terminal regions from intrinsic polysilicon material. When using a plastics substrate, a layer of amorphous silicon material is preferably deposited instead and converted to polysilicon by laser recrystallisation. A further layer 37 of silicon dioxide is then deposited completely over this structure and generally rectangular windows 39 overlying the regions 34 are defined therein. Portions of this layer 37 overlying the regions 33, 35 and 36 of the polysilicon layer serve as the gate insulator layers for the TFTs. Thereafter, a layer of chromium is deposited to a thickness of around 50 nm (500 A) completely over the layer 37 and through the windows 39 therein which is then photolithographically patterned to leave strips forming the row conductors 18 with integral extensions 38, providing the TFT gate electrodes, and regions constituting the sense electrodes 14 which are substantially coextensive with the regions 34 of polysilicon and extend over the regions 34 in the windows in the layer 37 and onto the upper surface of the layer 37 bordering the windows. An oxidation process is then carried out on the chromium layer to convert an upper surface region of the exposed parts of this layer to an oxide of chromium, Cr Ox. This is accomplished by immersing the structure in a bath of fuming nitric acid. Alternatively, the structure may be subjected to an oxygen plasma. As a result, a thin, highly uniform thickness, layer 40 of $Cr_2 O_3$ is formed directly and completely over the sense electrodes 14 and other exposed chromium parts, namely the row conductors 18 and the integral, gate electrode, extensions 38 as shown at 41 in FIG. 3.

The upper, exposed, surfaces of the layers 40 and 41 of all the sensing elements in the array together provide the sensing surface over which a person's finger is placed. The layers 40 constitute the aforementioned capacitor dielectric of the sense elements. Although the layers 40 and 41 do not extend continuously over the array, they occupy a substantial part, around 80 to 90% of the area of the array. Portions of the insulating layer 37 extend under the gaps between the layers 40 and 41. The chromium oxide layers 40 and 41 extend not only over the upper surfaces of the electrodes 14 and row conductors 18 but over their side walls as well. Thus, the upper surface of the structure is composed entirely of insulating material from the layers 40, 41 and 37. The layers 41 insulate the row conductors 18, preventing contact by a finger and the risk of shorts occurring between row conductors due to any moisture or the like on the exposed surface of the array.

The physical dimensions of the sensing electrodes 14 are selected according to the resolution characteristics required for fingerprint sensing. By way of example, the electrodes may have a pitch of around 50 to 100 micrometers in both the row and column directions. The thickness of the layer 40 may be varied between approximately 5 nm (50 A) and 200 nm (2000 A). Preferably, however, the thickness of the Cr Ox film 40 is selected to be around 10 nm. The film 40 has a dielectric constant which at this preferred thickness gives a capacitance value of approximately $6 \times 10^{-9} F/cm^2$. Such a layer is capable of withstanding around ±5 volts without passing current. Typically, a sense element of around 50 $\mu$m by 50 $\mu$m will provide a capacitance of around 0.2 pF when in contact with a fingerprint ridge.

The conversion of the upper surface region of the deposited chromium layer by oxidation in the above described manners is both simple and convenient. Accurate control of the thickness of the layers 40 and 41 is possible. The thickness of the layer 40, at around 10 nm for example, is much less than would be required using silicon nitride or polyimide material instead which is important when the very small capacitance values involved in a sense element array of this kind are taken into consideration. In addition, the excellent scratch resistant properties of the Cr Ox material make it eminently suitable as a protective layer and unlikely to suffer harmfully from abrasive agents which can be experienced in fingerprint scanning and cleaning in normal usage.

It is envisaged that other techniques could be used to form the directly overlying chromium and chromium oxide layers. For example, a layer of chromium may be deposited by sputtering. During the deposition, the sputtering gas is changed from argon to oxygen so as to build an oxide overlayer. By varying the oxygen concentration different kinds of chromium oxide (CrO, $CrO_2$ $Cr_2O_3$) can be produced. The layers are then suitably patterned using a wet etch or sputter etch process.

To complete the array structure, electrically conductive material can be provided over the upper surface of the array in the form of parallel strips or a grid pattern and overlying the spaces between adjacent rows and/or columns of the sense electrodes 14, as described in U.S. Pat. No. 5,325,442, and which in operation are grounded. It may be preferable to use parallel strips of conductive material extending in the row direction laterally offset from the row conductors 18 and not overlying the sensing electrodes 14. By virtue of contact between these conductors and a person's finger, grounding of the finger is ensured and the risk of damage to the array due to static electricity is avoided.

Other sense element arrangements can, of course, be used. For example the sense element may be of the kind described in British Patent Application No. 9608747.3 and having two TFTs whose gates are connected to different row address conductors and in which one TFT is operated to apply a charge to the sense electrode and the other TFT is operated to transfer the stored charge, as determined by the capacitance value dependent on the fingerprint portion, to a sense amplifier via a column address conductor.

Although the embodiment described above comprises a fingerprint sensing device, the capacitive sensing element array device may be used for other purposes. For example by scaling up the sense element area, a larger area capacitive sensing array can be provided suitable for use in a touch input system and responsive to a person's finger or a suitable stylus. Such a device can be used as a graphics tablet, a computer screen cursor control pad or the like.

Various modifications are possible as will be apparent to persons skilled in the art. In particular, the layout of the components of the sense elements and the materials used for the address conductors and TFTs may be varied. For example, the column conductors can be formed of metal and amorphous silicon material may be used for the TFTs.

Also, in the case of a small area array device such as a fingerprint sensing device, it will be appreciated that the sensing pad 10 could alternatively be fabricated using a semiconductor wafer and integrated circuit technology instead of using an insulating substrate and thin film device technology.

To summarise, therefore, a capacitive sensing array device, such as a fingerprint sensing device, has been disclosed which comprises an array of individual sensing electrodes covered by a layer of insulating material defining a sensing surface on which a person's finger is placed, each sensing electrode, its overlying fingerprint portion and intervening insulating layer providing a capacitance in operation. The sensing electrodes are of chromium and the covering insulating material comprises a thin layer of chromium oxide which offers excellent scratch resistance and can be formed conveniently by oxidation of a surface region of the sensing electrodes. In a row and column array, address lines extending between rows of electrodes may also comprise chromium and be covered by chromium oxide.

From reading the present disclosure, other modifications will be apparent to persons skilled in the art. Such modifications may involve other features which are already known in the design, manufacture and use of systems in the field of capacitive sensing array devices and component parts thereof and which may be used instead of or in addition to features already described herein.

What is claimed is:

1. A capacitive sensing array device comprising an array of sensing electrodes deposited on a substrate and each comprising a capacitor electrode, said sensing electrodes being covered by a layer of electrically insulating material defining a sensing surface spaced from the sensing electrodes with the insulating material forming a capacitor dielectric, wherein the sensing electrodes comprise chromium and the electrically insulating covering layer comprises chromium oxide formed from an oxidized surface region of the chromium sensing electrode.

2. A fingerprint sensing device comprising a capacitive sensing array device as in claim 1 in operation of which a person's finger is placed over the sensing surface and which includes means for detecting capacitances resulting from the presence of respective fingerprint portions overlying individual sensing electrodes.

3. A capacitive sensing array device according to claim 1, characterised in that the insulating layer has a thickness of about 5 to 10 nm.

4. A capacitive sensing array device according to claim 1, characterised in that the sensing electrodes are arranged in rows and in that the device includes electrically conductive address lines extending between adjacent rows of sensing electrodes which address lines comprise chromium and are covered by an insulating layer of chromium oxide that forms part of the sensing surface.

5. A capacitive sensing array device according to claim 4, characterised in that the sensing electrodes and address lines comprise portions of a common layer of chromium.

6. A capacitive sensing array device according to claim 4, characterised in that each sensing electrode is connected to a respective switching device which is located adjacent thereto and connected to one of said address lines.

* * * * *